United States Patent [19]

von Bonin et al.

[11] Patent Number: 5,616,628
[45] Date of Patent: Apr. 1, 1997

[54] PROCESS FOR THE PRODUCTION OF OPTIONALLY CELLULAR POLYURETHANES AND/OR POLYURETHANE UREAS

[75] Inventors: Wulf von Bonin; Hanns-Peter Müller, both of Odenthal; Manfred Kapps, Bergisch Gladbach, all of Germany

[73] Assignee: Bayer Aktiengesellschaft, Leverkusen, Germany

[21] Appl. No.: 615,657

[22] Filed: Mar. 13, 1996

[30] Foreign Application Priority Data

Mar. 20, 1995 [DE] Germany ............... 195 10 056.5

[51] Int. Cl.$^6$ .................................................. C08G 18/00
[52] U.S. Cl. ................. 521/157; 521/164; 521/165; 521/167; 521/176; 528/74.5; 528/72
[58] Field of Search ................... 521/157, 164, 521/165, 167, 176; 528/74.5, 72

[56] References Cited

U.S. PATENT DOCUMENTS 3,312,638  4/1967  von Bonin et al. ............... 260/2.5

FOREIGN PATENT DOCUMENTS 3833977  4/1990  Germany .
4414331  10/1995  Germany .

*Primary Examiner*—Rachel Gorr
*Attorney, Agent, or Firm*—Joseph C. Gil; N. Denise Brown

[57] ABSTRACT

Polyurethanes and/or polyurethane ureas which are optionally cellular are produced by the process of the present invention. This process consists of reacting at least one polyisocyanate with a specific reaction mixture. This reaction mixture contains A) non-basic compounds having a molecular weight of 62 to 10,000 and containing at least two hydroxyl groups; and B) at least one component selected from:
   B)1) basic polyhydroxyl compounds
and
   B)2) acids or the salts thereof;
and C) at least one component selected from:
   C)1) fatty acids
and
   C)2) the salts of the fatty acids.

The reaction occurs at temperatures of from 0° to 150° C., and component A) is used as an at least 50 wt. % aqueous solution.

18 Claims, No Drawings

PROCESS FOR THE PRODUCTION OF OPTIONALLY CELLULAR POLYURETHANES AND/OR POLYURETHANE UREAS

BACKGROUND OF THE INVENTION

The production of polyurethane foams in the presence of small quantities of water in order to utilize the quantity of $CO_2$ formed in the reaction with the polyisocyanates for the expansion of the foamed plastic is known.

Since even small quantities of water, particularly in association with the conventional activation of foamed plastics formation, lead to the evolution of large quantities of $CO_2$, only stoichiometrically very small quantities of water are used. The addition of large quantities of water usually leads to unstable, inhomogeneous or mostly unusable, that is, undesirable products of the process.

In DE-OS 4,414,331 and 4,438,409, optionally cellular polyurethanes and/or polyureas are described. These references describe the reaction of film-forming aluminum-phosphate-alkanolamine complexes, present in aqueous solutions, together with polyisocyanates and basic polyols, as well as auxiliary substances and other additives to form fire-resistant polyurethane/polyurea foamed plastics which are of interest technically. Although such formulations, or reaction mixtures, contain large, non-stoichiometric quantities of water which is considerably in excess of the quantities of water usually employed for purposes of expansion.

Characteristic of these processes is the use of substantial quantities of film-forming metal phosphate-alkanolamine complexes in aqueous solutions. Surprisingly, these film-forming metal phosphate-alkanolamine complexes in aqueous solutions can be used for the formation of PU foamed plastics according to the invention, without the large quantities of water thereby brought into the production process which hinders the formation of usable foamed plastics or causes an undesirably vigorous evolution of $CO_2$ through consumption of the polyisocyanate present.

Until now it could be assumed that the presence of film-forming metal phosphate complexes is necessary for the surprising formation of usable foamed plastics by the above processes. Possibly, this is due to their apparent polymer-like character, or because the metals might have a controlling effect on the isocyanate reaction, or such concentrated solutions of the complexes are, for reasons unknown, particularly suitable for these processes.

Surprisingly, it has now been established that viscous, or concentrated solutions such as, for example, 75% aqueous solutions of sugars, protein hydrolysates, or even other polyhydroxyl compounds can also be used in a similar manner for the production of foamed plastics which are of interest technically, without the concomitant use of organo-metallic or amine catalysts which are known per se.

By virtue of the present invention, henceforth even water-soluble, so-called renewable raw materials which are insoluble in the previously known conventional PU foam formulations can be used in a very simple manner for the production of foamed plastics having varied technical uses and good biodegradability and/or fire resistance. Examples of the so-called renewable raw materials include, for example, saccharose, water-soluble starches, dextrins, dextrans and similar carbohydrates or hydrolysates obtainable from cellulose or starches, so-called glucose syrups or sugar syrups or even protein-containing solutions.

DESCRIPTION OF THE INVENTION

The invention provides a process for the production of polyurethanes and/or polyurethane ureas which are optionally cellular. This process comprises reacting at least one polyisocyanate with an isocyanate-reactive mixture comprising A) one or more non-basic compounds having a molecular weight of 62 to 10,000 and possessing at least two hydroxyl groups and B) at least one component selected from the group consisting of 1) a mixture of basic polyhydroxyl compounds comprising
   i) at least one compound selected from the group consisting of monoalkanolamines, dialkanolamines, trialkanolamines and mixtures thereof, and
   ii) at least one compound having an OH number of between 300 and 800, said compound being the reaction product of a) an alkylene oxide and ii) a compound selected from the group consisting of ammonia, alkanolamines, diamines and polyamines, and 2) at least one acid or the salt thereof, wherein the acid is an organic carboxylic acid having less than 8 carbon atoms or an inorganic acid; and C) at least one component selected from the group consisting of:
   1) at least one fatty acid having more than 8 carbon atoms, and
   2) at least one salt of said fatty acid.

The reaction between the polyisocyanate and the isocyanate-reactive mixture is at temperatures of from 0° to 150° C., preferably of from 10° to 60° C., with component A) being present as an at least 50% by weight, preferably 60 to 95% by weight aqueous solution.

The reaction between the isocyanate-reactive mixture and the polyisocyanate may occur in the presence of any combination of the following components: D) conventional stabilizers, E) blowing agents, F) other auxiliary substances, and G) fillers.

It is preferred that:

the non-basic polyhydroxyl group containing compounds A) are selected from the group consisting of polyalcohols, sugars, N-methylol compounds, C-methylol compounds, reaction products of phosphoric acids and/or boric acids with basic alcohols (ethanolamine), and protein solutions or protein hydrolysate solutions. These compounds are particularly suitable as aqueous solutions having pH values of from 5 to 8, preferably of from 6 to 7.0 (as measured in aqueous solution).

the basic polyols B)1) are mixtures of i) at least one monoalkanolamine, dialkanolamine, trialkanolamine or mixtures thereof, with ii) at least one compound having an OH number of from 400 to 600, most preferably from 450 to 550, and being the reaction product of a) an alkylene oxide, most preferably ethylene oxide and/or propylene oxide, with b) ammonia, (poly)alkylene diamines, and/or (poly)alkylene polyamines. Preferred (poly)alkylene diamines include ethylenediamine and/or hexamethylenediamine, and preferred (poly)alkylene polyamines include preferably polyethylene polyamines, with triethanolamine being particularly preferred. A most preferred combination of all basic polyols is i) triethanolamine, and ii) the propoxylation products of triethanolamine having OH numbers of from 400 to 600, in particular from 450 to 550.

the acids B)2) are selected from organic acids such as, for example, preferably of the lower carboxylic acid type having fewer than 8 carbon atoms, and/or inorganic acids such as, for example, HCl or HBr, or most preferably o-phosphoric acid, the fatty acids C)1) are selected from carboxylic acids having more than 8 carbon atoms, in particular aliphatic, long-chain, saturated and/or unsaturated carboxylic acids having 9 to 24 carbon atoms, most preferably 12 to 24 carbon atoms. Oleic acid is particularly preferred.

the salts C)2) of the fatty acids are preferably those formed by reaction of fatty acids with an alkali metal compound, and/or those formed by reaction of fatty acids with the basic polyhydroxyl compounds described above, stabilizers D) are preferably the polyetherpolysiloxane stabilizers known from polyurethane chemistry, blowing agents E) are preferably the blowing agents known from polyurethane chemistry, preferably fluorocarbons and/or CFCs and/or hydrocarbons, preferably cyclopentane, as auxiliary substances F) are used urea as a processing agent, in addition to conventional organometallic and/or amine activators, surfactants, regulators of cell size and cell type, biocides, preservatives, antioxidants, technically conventional halogen-containing and/or halogen-free flameproofing agents, other active agents, colorants, odorous substances and/or release agents, the auxiliary substances F) preferably are 30 to 50 wt. % solutions of alkali hydroxides, preferably NaOH, or 50 to 88 wt. % solutions of $H_3PO_4$. The reaction rates of the mixtures and the pore structures and stability of the foamed plastics formed may be influenced by additions of such solutions.

the products obtained by the process are produced and dried respectively at temperatures of between 0° and 150° C., preferably 0° and 100° C., the products of the process thus obtained are produced by technically conventional processes such as, for example, casting, centrifuging or spray processes, flat, or in open or closed, heated or unheated molds, without pressure or under excess pressures, operating continuously or batchwise.

According to the present invention, it is preferred that the foamed plastics obtainable by the above-mentioned process are produced at temperatures of from about 0° to 150° C., preferably of from 10° to 60° C., and most preferably of from 15° to 50° C.

The products of the process are preferably used as molded parts, granular material, fillings for cavities, sealants, bonding agents, shock absorbers, packaging materials, coverings, coatings, vacuum panels, sandwiches and/or construction elements, thermal and/or acoustic insulating materials, absorbers for aqueous and other liquids, carriers for active substances and microorganisms, filtering materials for gases, and/or dusts and liquids.

It is also an object of the present invention to provide, in addition to the above-mentioned process, the products produced by this process. These products are, preferably, foamed plastics, and may be used in the above-mentioned areas.

The production according to the invention of the preferably cellular polyurethanes and/or polyurethane ureas from the starting materials is suitably carried out by the continuous or batchwise processing techniques known in polyurethane chemistry.

In this aspect, it is of interest that the viscosity of the aqueous solutions used according to the invention can in many cases be markedly lowered by additions of up to 50%, preferably of from 5 to 25%, of urea, based on the solid matter in the aqueous solution constituting the starting material. The miscibility, or the processability and dispersibility thereof in the reaction mixture can be improved, so that additions of urea as a processing agent to A) of from 5 to 0.5 wt. %, preferably of from 30 to 3 wt. %, based on the solid component A), are recommended. It is moreover noteworthy that the urea additive can in many cases have a plasticizing effect.

The products obtainable by the process, in particular the foamed plastics preferred according to the invention having weights per unit volume of between 15 and 300 g/l, mostly have a fine-pored, homogeneously acting character. They may be largely open-pored or largely closed-pored, depending on the formulation and/or the production process. In many cases they exhibit characteristics of semi-rigid to rigid foams with good to very good capacities to absorb water or other aqueous liquids. In many cases, they are to a large extent biodegradable, apparently owing to their potential content of natural substances, which also renders them suitable, if necessary, as largely degradable carriers for microorganisms such as, for example, in biofilters or in waste treatment plants.

Due to the rigid foam character achievable, molded parts or construction elements can be readily obtained from the products of the process. In this aspect of the invention, it is of interest that the foamed plastics obtainable according to the invention can often be finished by being thermoplastically shaped such as, for example, molded or multi-dimensionally formed, in the temperature range of between 100° and 200° C.

The following is noted regarding the suitable starting materials:

the percentage data for the quantities used of the respective constituents of the formulation amount to 100% in the individual examples of the formulation.

the pH values given have been determined using M&N Tritest L-pH measuring paper in aqueous solution.

Suitable polyisocyanates or possibly polyisocyanate mixtures include aliphatic, araliphatic and/or aromatic, modified and/or unmodified polyisocyanates known from prior art, which are described, for example, in DE-OS 4,309,691 (columns 2 and 3) and DE-OS 2,832,253 (pages 10 and 11). The technical MDI types based on aniline-formaldehyde condensates are preferred due to their ready availability and their low vapor pressure.

The polyisocyanates are incorporated into the products of the process in quantities of from 12 to 60 wt. %, preferably of from 15 to 40 wt. %.

The polyols A) containing at least two hydroxyl groups, have molecular weights of 62 to 10,000. Mixtures of suitable polyols may be used. These polyols are preferably present in the form of their 50 to 98% by weight aqueous solutions, in particular 60 to 95% by weight aqueous solutions, and optionally also in mixed forms which are in solution, colloidally distributed, and/or dispersed.

Primarily suitable as aqueous solutions of the polyols A) are those prepared from mono-, di-, oligo- and/or polysaccharides which are available in large quantities. These include compounds such as, for example, xylose, dextrose, fructose, glucose, lactose or saccharose, or the mixtures of sugars obtainable from celluloses or starches by fermentative, enzymic or hydrolyric processes such as, for example, the so-called sugar syrups or glucose syrups or even optionally concentrated plant juices, for example, pressed sugar cane juice or pressed sugar beet juice. Solutions containing saccharose are particularly suitable.

The following are also suitable: sugar alcohols, for instance, sorbitol, mannitol or xylitol, as well as sugar acids, whey concentrates, plant gums, dextrins, dextrans, decomposed or derivatized starches and celluloses which are largely water-soluble, for example, hydroxyethyl celluloses, hydroxyethyl starches, cellulose sulphates, polymers and copolymers of vinyl alcohol, as well as of formaldehyde, the so-called formoses, as well as in principle lower polyhydroxyl compounds such as, for instance, glycerol, trimethylolpropane, pentaerythritol and the preferably water-soluble condensation or alkoxylation products thereof and the boric acid adducts obtainable from the various polyhydroxyl compounds.

According to the invention, suitable polyhydroxyl compounds A) also include, water-soluble polymers or polycondensates containing OH groups such as, for example, relatively low-molecular weight polyvinyl alcohol types, acrylamide polymers, tartaric acid polyesters, also proteins or macerated proteins or protein hydrolysates, whey concentrates or polyacrylonitrile hydrolysates as well as collagens, gelatins and plant gums (polysaccharides).

According to the invention, also suitable as component A) are compounds such as N-methylol compounds, which are preferably soluble in water but may optionally also form dispersions and/or colloids, such as methylol compounds of urea, of biuret or of polyureas, of guanidine, of polyamides, of polyacrylamides, of dicyandiamide, of urazole, of melamine, with the latter, like the former, being preferred in the form of their water-soluble, commercially available urea resins or melamine-formaldehyde resins, and in future also C-methylol compounds, such as the water-soluble resols, resorcinol-formaldehyde resin precursors or ketone-formaldehyde resin precursors or glycerol, trimethylolpropane and their condensates, optionally with the incorporation of citric acid or tartaric acid.

Suitable compounds to be used as polyols A), and in particular for the production of fire-resistant products of the process, which may optionally be mixed with other polyols A) and/or urea, are the reaction products of boric acids, preferably o-boric acid and/or phosphoric acids, for example, polyphosphoric acids such as o-phosphoric acid in particular, with alkanolamines. These products are obtained, for example, by reacting 85% technical o-phosphoric acid at 15° to 150° C. in particular with monoethanolamine, optionally and/or with diethanolamine and/or triethanolamine. Also suitable are the reaction products of one more of o-boric acid with one or two or three moles of monoethanolamine, optionally and/or with diethanolamine and/or triethanolamine. It is preferred to adjust the pH values of these latter reaction products to a pH of between 6 and 7 using o-phosphoric acid.

Particularly preferred compounds to be used as polyols A) present in aqueous solution or optionally also colloidally and/or as dispersions, at pH values of between 5 and 8, preferably of between 6 and 7, are saccharose, and the so-called sugar syrups obtainable from starch or cellulose, as well as melamine methylol compounds or urea methylol compounds, and reaction products of o-boric acid and/or o-phosphoric acid with alkanolamines. The reaction product of o-boric acid and/or o-phosphoric acid with any/all of the three ethanolamines (mono-, di- and tri-) are particularly preferred. Combinations of these components A) with those described above are also preferred.

Any of the polyols A) described above may be used alone or as mixtures of various kinds.

The products of the process according to the invention contain from 30 to 70 wt. %, preferably from 50 to 65 wt. %, of these polyols A) incorporated therein.

Suitable to be used as component B)1) is a mixture of basic polyhydroxyl compounds. These mixtures comprise i) alkanolamines such as, for example, triethanolamine, diethanol-propanolamine, ethanol-dipropanolamine, and/or tripropanolamine, in combination with ii) the compounds having OH numbers of between 300 and 800, preferably between 400 and 700, and being the reaction product of a) an alkylene oxide, such as ethylene oxide, and preferably propylene oxide with b) ammonia, an alkanolamine, a diamine or a polyamine, with alkanolamines being particularly preferred.

Combinations of i) triethanolamine and ii) the propoxylation products of triethanolamine having OH numbers of from 400 to 600, in particular from 450 to 550, are of special interest as they are particularly useful.

Also suitable as i) alkanolamines are monoethanolamine, monopropanolamine, diethanolamine, dipropanolamine, and ethanol-propanolamine. Suitable for use as components ii) are the alkoxylation, specifically ethoxylation products, propoxylation products, or mixed alkoxylation products of monoethanolamine, monopropanolamine, diethanolamine, dipropanolamine, and ethanol-propanolamine within the above-mentioned ranges of OH numbers. Also suitable are alkoxylation products of, for example, ammonia, ethylenediamine, propylenediamine, N-dimethylethylenediamine, diethylenetriamine, triethylenetetramine, and/or hexamethylenediamine.

Particularly suitable as component B)2) are the acids or acid mixtures such as, for example, phosphoric acid, in particular o-phosphoric acid but, optionally, also methylphosphonic acid, phosphinic acid, polyphosphoric acid, and acidic alkyl phosphates such as dibutyl phosphate, boric acid, for instance o-boric acid, sulfuric acid, for instance $H_2SO_4$ and/or (organic) sulfonic acids, amidosulfonic acids, HCl, HBr, carbonic acid or lower mono- and/or polycarboxylic acids and/or their partial esters such as, for example, phosphonocarboxylic acid, formic acid, acetic acid, maleic acid, maleic acid half-ester, lactic acid or citric acid. Also suitable as component B)2) are the salts of the above acids.

The basic polyhydroxyl compounds B)1) and/or the acids B)2) or the salts of the acids B)2) are present in the products of the process according to the invention in quantities of from 3 to 35 wt %, preferably of from 5 to 25 wt. %.

Suitable fatty acids C)1) include separate or mixed aromatic, araliphatic, cyclic, or aliphatic fatty acids. These are preferably aliphatic, fluorine-containing or fluorine-free sulfonic acids, carboxylic acids, preferably monocarboxylic acids or carboxylic acid mixtures, which are liquid at 0° to 45° C., preferably at 10° to 25° C., such as for instance alkylsulfonic acids, fatty acids from soy bean oil, olive oil, sunflower oil, linseed oil, rosin oil, root oil, tall-oil, castor oil, fish oil, rape oil, palm nut oil. Oleic acid is particularly suitable. The following compounds are also suitable for use as fatty acids: (iso)stearic acid, montanic fatty acids, collophonium acids, phenylalkylcarboxylic acids, optionally alkoxylated phenylcarboxylic acids, alkylbenzene-sulfonic acids, alkylbenzene-carboxylic acids, or phthalic or maleic half-esters of long-chain fatty alcohols.

It is preferred that the salts C)2) of the above fatty acids are the alkali metal salts of the fatty acids described above. Most preferred are the sodium (Na) salts, or the potassium (K) salts of the fatty acids. Also, the reaction product of these fatty acids with the basic polyhydroxyl compounds B)1) are as suitable as salts of the fatty acids. It is also possible that ammonium salts, salts of other metals, or amine salts of the fatty acids may be used.

The fatty acids C)1 ) are preferably present in quantities which are less than stoichiometric, referred to the basic components in the entire reaction mixture, while the pH values of the mixture may also be below 7.

The fatty acids C)1) and salts thereof C)2) are contained incorporated in the products of the process according to the invention in quantities of from 0 to 10 wt %, preferably of from 1 to 6.5 wt. %. However, in principle, higher quantities of fatty acids may possibly be incorporated.

The presence of the fatty acids C)1 ) is, in principle, not absolutely necessary, but the presence of these fatty acids enhances the formation of usable foamed plastics to an unexpectedly marked degree. This is particularly true when used in the preferred quantities, so that the concomitant use thereof is recommended unconditionally.

Suitable auxiliary substances F) also include, apart from urea as a processing agent, activating or catalytically active individual amines and organometallic compounds such as, for example, of tin, lead, and zinc, and conventionally used in polyurethane foamed plastics technology. Although the concomitant use of these activating/catalytic substances may be fully considered, it has surprisingly been found that these can generally be dispensed with according to the present invention, without having a negative effect on the formation of foamed plastics. This is considered as a technical advantage of the present invention.

Substances which have also proved successful as flameproofing agents, apart from the metal halides and/or ammonium halides optionally usable in aqueous solution, in particular chlorides anal bromides, and haloalkyl phosphates, include the halogen-free esters, metal salts or ammonium salts, and/or amine salts, preferably the poly forms and/or ortho forms of phosphoric acid and/or boric acid, for instance, alkali polyphosphates, ammonium polyphosphates, diphenylcresyl phosphate, or triethyl phosphate.

Suitable fillers G) which may optionally be used in combination with the reaction mixture include, for example, the mostly pulverulent, optionally also fibrous or plateletforming fillers known in polyurethane foamed plastics technology. They may be, for example, crushed rocks such as chalk, dolomite, heavy spar, silica, silicates, clays, ashes, apatites, plasters, magnesium hydroxide or aluminum hydroxide or sand, glass, iron oxides or possibly starches, powdered cellulose, sawdust, flour, powdered milk, powdered synthetic resin, powdered metal, red phosphorus, coke, powdered hard coal, powdered lignite, carbon blacks, graphite, expanded graphite, fibers, (hollow) balls or foam beads, or thermoplastics powder, or thermosetting plastics powder, for example, based on melamine aminoplastics and/or urea aminoplastics.

It is of particular interest that in accordance with the invention, aqueous filler preparations such as, for example, colloidal solutions, sols or, for example, dispersions of silica and/or plastics, can also be used as fillers. Examples of such dispersions include polyacrylonitrile, polystyrene/acrylonitrile, polystyrene/butadiene, polyvinyl acetate rubber latexes, poly(meth)acrylate rubber latexes, polyolefin rubber latexes, clay dispersions or montmorillonite dispersions or silica sols. Those which have solids contents of more than 45 wt. % and which are film-forming at temperatures between 0° and 50° C., and preferably between 10° and 35° C. are preferred.

In this sense, it may be possible that, for example, the polyhydroxyl compounds A) and mixture of basic polyhydroxyl compounds B)1) such as, for instance, cane sugar and/or triethanolamine, can in many cases be dissolved in the aqueous dispersions of fillers. This avoids/prevents an excessive dilution of the reaction system by water.

The solids content of the fillers in the products of the process according to the invention varies between 0 and 60 wt. %, preferably between 0 and 30 wt. %.

The production of foamed plastic according to the invention is generally carried out at temperatures for the starting materials of from 10° to 100° C., preferably of from 15° to 50° C. As occasionally larger quantities of water contained in the reaction mixture during the self-accelerating isocyanate reactions must be heated by the latter, it can occasionally be advantageous to completely, or preferably partly, preheat the reaction components and/or to continue to heat the reacting reaction mixture by, for example, using microwaves, IR radiation or in an oven, or in molds having low heat dissipation or equipped with heating.

On the other hand, it is frequently advantageous to bring the freshly produced foamed plastics to final reaction and to dry them by heating the produced foamed plastics to temperatures of from 30° up to 150° C., preferably up to 120° C., and most preferably up to 100° C.

The products of the process can be obtained either continuously or batchwise, with high pressure and/or low pressure mixing, at normal pressure or at increased pressures, by the procedures conventional in polyurethane foam technology such as, for example, by two-dimensional spraying, by pouring on or pouring in, by foaming in cavities or molds, or in, for example, double conveyor belt units or spray towers as in, for example, for the production of beads.

The components can be introduced into the mixing or reaction chamber separately or else mixed, optionally also in the form of freshly produced premixes. The reaction chamber may optionally also be tempered or insulated, for example, for the production of molded parts having high-density surface layers. The use of nozzle mixer heads and/or of agitated mixer heads and/or of static mixers may also be considered suitable.

The reaction rate of the mixtures can easily be adjusted to the processing requirements by the addition of aqueous alkali hydroxide solution (faster) or of o-phosphoric acid (slower).

The viscosity of the mixtures can be adjusted or lowered within certain limits by additions of urea.

The products of the process obtained according to the invention are preferably cellular, that is, open-cell and/or closed-cell. Less preferred, non-cellular products or products containing few cells, can be obtained under pressures of between I and about 150 bar with the omission of the blowing agents E).

The preferred products of the process have dry weights per unit volume of between 15 and 300 g/l, preferably between 18 and 100 g/l, and most preferably between 20 and 50 g/l. However, higher weights per unit volume as well as lower weights per unit volume are also obtainable.

The products of the process according to the invention are used preferably for purposes of acoustic, thermal, and/or mechanical insulation, and in many cases as fillings for cavities, or as sandwiches optionally having outer layers which are permeable to water vapor or possibly impermeable to air or gas. In the case of outer layers which are permeable to water vapor, the products can ensure particularly good room air conditions owing to a water balance dependent on atmospheric moisture.

They are also suitable, however, to be used for vacuum panels, as material for shock absorbers, as absorbers for gaseous and preferably liquid media, in particular aqueous liquids, as well as for the production of optionally biodegradable containers or substrates, for example, in microbiological techniques, plant breeding, or formulation of active substances optionally having repository action. Other fields of application have previously been listed above.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

The starting materials are described as follows:
Aqueous solutions of polyols A):
A/1: a 75% aqueous solution of a commercially available hexamethylol melamine resin (commercially available as Madurit® MW 550, from Casella)
A/2: a 75% aqueous solution of a commercially available urea-methylol resin (commercially available as Urecoll® 237, from BASF)
A/3: a 75% aqueous cane sugar solution
A/4: an approx. 80% aqueous glucose syrup solution (commercially available as Dormamix®, from Pfeiffer & Langen)
A/5: the reaction product of 1 mol of o-boric acid and 1 mol of monoethanol-amine, prepared at 80° C. and subsequently adjusted to a pH value of 6.3 using 85% aqueous o-phosphoric acid.
A/6: the reaction product, adjusted to a pH of 6.5, of 85% aqueous o-phosphoric acid and a 75% aqueous solution of triethanolamine, prepared by slowly stirring triethanolamine into the phosphoric acid previously placed in a receiver at 90° C. and addition of 10% urea (referred to the overall quantity) and further stirring for one hour at this reaction temperature.
A/7: a commercially available concentrated pressed sugar beet juice containing approx. 25% water, so-called sugar beet syrup.
A/8: a dispersion of 300 parts of commercially available domestic wheat flour in 400 parts of water at 18° C.
A/9: an enzymically obtained, approx. 70% sugar syrup (commercially available as Dormadex® 98/70, from Pfeiffer & Langen)

Basic polyols B):
B/1: triethanolamine
B/2: propoxylated triethanolamine, having an OH number of 500
B3: propoxylated triethylenetetramine, having an OH number of
B/4: ammonia alkoxylated with a mixture of equal parts of ethylene oxide and propylene oxide, having an OH number of 420

Inorganic Acids C):
C/5: 85% technical o-phosphoric acid

Fatty Acids D)1):
D/1: oleic acid
D/2: ricinoleic acid
D/3: fatty acid mixture from linseed oil
D/4: fatty acid mixture from tall-oil Stabilizers F):
F/1: a foam stabilizer based on polyetherpolysiloxanes (commercially available as AC 3408 from Bayer AG)

Blowing agents G):
G/1: cyclopentane

Polyisocyanates P):
P/1: technical MDI-type based on aniline-formaldehyde condensates (Desmodur® 44 V 20; Bayer AG)
P/2: technical tolylene diisocyanate (Desmodur® T 80; Bayer AG)
P/3: technical hexamethylene diisocyanate trimer (Desmodur® N 100: Bayer AG)

Note:
All pH values were measured in 10% aqueous solution.

EXAMPLE 1 a) A mixture of 300 parts of A/1; 25 parts of B/2; 14 parts of D/; 20 parts of B/1; 2 parts of F/1 as well as 10 parts of C/5 and 30 parts of G/1 was prepared and then intimately mixed at room temperature with 110 parts of P/1. The charge was then placed in a box mold made of wrapping paper contained in a rigid foam box and thus allowed to expand. A well expanded stable foam was obtained, which set after about 3 minutes. After the foam was dried at 90° C., a weight per unit volume of 35 g/l was established. The foamed plastic had an even pore structure, a brittle rigid foam character, and achieved the classification B2 in the fire test.

EXAMPLE 2 a) The procedure as described in Example 1a) was followed, with the same formulation except that 30 parts of urea were additionally dissolved in the solution A/1 prior to mixing with the other components. This reaction mixture resulted in a foam comparable to that in Example 1, but having a finer pore structure and a weight per unit volume of 28 g/l.

b) The procedure as described in Example 1a) was followed, with the same formulation except that a mixture of equal parts of A/2 and A/3 was substituted for A/1. This mixture produced a fine-pored foamed plastic which, after being dried at room temperature, had a weight per unit volume of 30 g/l and achieved the fire classification B2.

EXAMPLE 3 a) A solution of 6,180 parts of o-boric acid in 6,108 parts of monoethanolamine was prepared at 80° C. 3,072 parts of this solution was adjusted to a pH value of 6.5 with (1,380 parts of) C/5 as described above.

b) 300 parts of the solution prepared in Example 3a) were well stirred with 25 parts of B/2; 20 parts of B/1; 12.5 parts of D/1; 10 parts of C/5; 2 parts of F/1 and 30 parts of G/1, and then intimately mixed at room temperature with 110 parts of P/1. The reaction mixture was transferred to a box mold as described above, and allowed to expand. A fine-pored, stable and homogeneously acting foam was formed. After drying, the foam had a weight per unit volume of 42 g/l. It achieved the classification B2 in the fire test.

EXAMPLE 4 a) The procedure as described in Example 3b) was followed, with the same formulation except that 2 parts of a 50% aqueous solution of NaOH were substituted for 10 parts of C/5, and were stirred in. From then on, the reaction mixture expanded markedly more rapidly and had finer pores. The dry weight per unit volume achieved was 33 g/l.

b) The procedure as described in Example 4a) was followed, but a mixture of 90 parts of P/1 and 40 parts of P/3 was used instead of 110 parts of P/1. After drying at 90° C., a fine-pored foamed plastic having a weight per unit volume of 30 g/l was obtained which achieved the fire classification B2.

EXAMPLE 5 a) 61.8 parts of o-boric acid were dissolved in 123 parts of monoethanolamine at 75° C. 2,575.2 parts of this solution were well stirred at 80° C. with 1,778 parts of C/5. The resultant solution had a pH value of 6.3.

b) 600 parts of the solution prepared in Example 5a) were stirred together with 50 parts of B/2; 20 parts of B/1; 30 parts of D/1; 20 parts of C/5; 5 parts of F/1 and 62 parts of G/1, and then intimately mixed at room temperature with 230 parts of P/1. The reaction mixture expanded in a box mold to form a very fine-pored, stable foamed plastic, which set after about 3 minutes. After the foam had been dried at 90° C., a weight per unit volume of 30 g/l was determined, and the fire classification B2 was achieved.

EXAMPLE 6 a) 61.8 parts of o-boric acid were dissolved in 149 parts of triethanolamine at 90° C. 57.5 parts of C/5 were added to this solution, and the mixture was stirred for 2 hours at 75° C. A further 10 parts of urea and 10 parts of A/7 were dissolved in 80 parts of the solution thus obtained. The pH value of the resultant solution was 6.4.

b) The solution prepared in Example 6a) was further processed as in Example 5b). A fine-pored, stable foam was obtained, which after drying at 90° C. had a weight per unit volume of 38 g/l and achieved the fire classification B2.

EXAMPLE 7

200 parts of A/6; 100 parts of A/3; 40 parts of B/2; 20 parts of B/1; 15 parts of D/3; 5 parts of D/1; 3.5 parts of F/1; and 30 parts of G/1 were stirred together, and intimately mixed at 18° C. with 125 parts of P/1. The reaction mixture was then allowed to expand in a box mold, and dried at 45° C. A homogeneously acting fine-pored foamed plastic having a weight per unit volume of 40 g/l was obtained. This foamed plastic achieved the fire classification B2.

EXAMPLE 8 a) 150 parts of the solution prepared in Example 5a) and 60 parts of A/7 are dissolved at 45° C. in 150 parts of A/8.

b) 300 parts of the solution prepared in Example 8a) are mixed with the same formulation as described in 3b) (except the above solution was substituted for the solution prepared in Example 3a)), and the mixture was processed into a foamed plastic as described in Example 3b). After drying, a homogeneously acting foamed plastic having a weight per unit volume of 45 g/l was obtained. It achieved the fire classification B2.

EXAMPLE 9

150 parts of A/4 and 150 parts of A/7 were intimately stirred together with 3 parts of 50% NaOH, 30 parts of B/2; 25 parts of B/3; 20 parts of B/1; 17 parts of D/4; 3 parts of F/1; 35 parts of G/1, and then intimately mixed with 160 parts of P/1 and placed in a box mold. This box mold was immediately transferred to a hot cabinet at 50° C., wherein the reaction was brought to completion. After drying, a fine-pored, homogeneous foamed plastic having a weight per unit volume of 33 g/l was obtained. The foam had a semirigid character and was very suitable for the purpose of shock absorption or as packaging material.

EXAMPLE 10

450 parts of A/3 were stirred together with 40 parts of B/2; 30 parts of B/1; 15 parts of D/1; 2.5 parts of F/1; 25 parts of G/1, and then intimately mixed at 16° C. with 100 parts of P/2. The reaction mixture thus prepared was allowed to expand in a box mold. After drying at 75° C., a homogeneously acting foamed plastic having an average pore diameter of 1.0 mm was obtained.

EXAMPLE 11 a) 100 parts of A/4; 100 parts of A/5; and 100 parts of A/7 were stirred together with 25 parts of B/2; 25 parts of B/4 and 20 parts of B/1; as well as 15 parts of D/2; 2.5 parts of F/1; 32 parts of G/1, and then intimately mixed at room temperature with 150 parts of P/1. The reaction mixture was then foamed in a box mold at 40° C. in a forced-air oven. After drying, a fine-pored, bubble-free foamed plastic having a weight per unit volume of 34 g/l was obtained, which achieved the fire classification B2.

b) The procedure as described in Example 11a) was followed, with the same formulation except that A/9 was substituted for A/4. A foamed plastic of similar appearance as that in Example 11 a) was obtained.

EXAMPLE 12

Examples of some possibilities for varying the process for the production of foamed plastics from aqueous solutions according to the invention are explained by means of the following embodiments.

a) 300 parts of A/3; 3 parts of 50% aqueous NaOH solution; 12.5 parts of D/1; 20 parts of B/1; 25 parts of B/2; 2 parts of F/1; 30 parts of G/1 are intensively stirred. This premix is then intimately mixed with 110 parts of P/1 at about 18° C. for about 60 seconds, and placed in a box mold. The reaction mixture expanded to form a very fine-pored, homogeneous foam, which was dried at 80° C. A weight per unit volume of 33 g/l was determined for the resultant product. In spite of the high proportion of sugars, the resultant foam scarcely swelled in the water but it readily takes up water as well as non-aqueous liquids. It is, by nature, highly combustible, has a semirigid character and is suitable, for example, for packaging purposes.

b) The procedure as described in Example 12a) was followed, except that 400 parts of A/3 and 150 parts of P/1 were used instead of the quantities described above. A foam was obtained which had a dried weight per unit volume of 35 g/l and was, incidentally, very similar to the foamed plastic obtained in a).

c) The procedure as described in Example 12a) was followed, except that now 500 parts of A/3, 30 parts of B/1 and 165 parts of P/1 were used instead of the quantities described therein. A foam was obtained which was very similar to the types produced in Examples 12a) and 12b). This foamed plastic had a weight per unit volume of 37 g/l and contained 63% of sugar incorporated, but was very stable mechanically and was suitable, for example, for the production of molded parts, containers or packaging material.

d) The procedure as described in Example 12a) was followed, but without the addition of D/1. This resulted in an uneven, relatively tough foamed plastic having large pores and a weight per unit volume of about 60 g/l being obtained. This Example demonstrates the greatly improved effect of the addition of a fatty acid.

e) The procedure as described in Example 12a) was followed, with the same formulation except that a quantity of fatty acid was used which exceeded the preferred limits such as, for example, 40 parts of fatty acid. This resulted in an inhomogeneously acting, bubble-containing reaction product which was not considered a usable foamed plastic.

f) The procedure as described in Example 12a) was followed, with the same formulation except that D/2 was used instead of D/1. A fine-pored stable foamed plastic was obtained which was virtually identical to the product of the process in Example 12a).

g) The procedure as described in Example 12a) was followed, with the same formulation except that 12.5 parts of acetic acid were substituted for D/1. An only negligibly expanding reaction mixture was obtained, which resulted in an uneven, bubble-containing material having a weight per unit volume of 220 g/l, which was not considered a usable foamed plastic. This example demonstrated the important role of a long-chain fatty acid.

h) The procedure as described in Example 12a) was followed, except that component B/2 was not added to the formulation. No usable foamed plastic was obtained, as a mixture of B/1 with a higher alkoxylation product was not used.

j) The procedure as described in Example 12a) was followed, except that component B/1 was not added to the formulation. Only a moderately good foamed plastic was obtained. This plastic exhibited a tendency to shrink and had no strength, because of the absence of an alkanolamine in the formulation.

k) The procedure as described in Example 12a) was followed, except that the formulation contained 60 parts of B/1, and the expanding reaction mixture was transferred to a box mold which was placed in a forced-air oven at 80° C. A very fine-pored, homogeneous foamed plastic having a dry weight per unit volume of 28 g/l and good strength was obtained.

l) The procedure as described in Example 12a) was followed, except that the formulation was modified as follows: 400 parts of A/3 instead of 300 parts, 3 parts of F/1 instead of 2 parts, 80 parts of B/1 instead of 20 parts, and 50 parts of B/2 instead of 25 parts. The remaining components and parts by weight in the premix were the same as in Example 12a). This premix was intimately mixed with 170 parts of P/1 (instead of 110 parts). An outstandingly fine-pored and homogeneously expanded foamed plastic was obtained having relatively good mechanical strengths and a dry weight per unit volume of 25 g/l.

m) The procedure as described in Example 12a) was followed, except the formulation was modified by doubling the quantities of F/1 and P/1 therein. The box mold charged with the reaction mixture was placed in a forced-air oven at a temperature of 60° C. A stable foam having an average pore diameter enlarged to about 1 mm, a weight per unit volume of 18 g/l and a character similar to that of a flexible foam was obtained. This product is suitable as liquid-absorbing upholstery and packaging material.

n) The procedure as described in Example 12a) was followed, except the formulation was modified by substituting a solution of 20 parts of urea in 80 parts of A/3 for the A/3 in Example 12a). The viscosity of the solution of urea in A/3 was lower than that of A/3, despite having a higher solids concentration. A very homogeneously acting fine-pored foamed plastic having a weight per unit volume of 26 g/l was obtained, having a semi-rigid character which was definitely more flexible and ductile in comparison to the product of Example 12a). This foamed plastic may be used, for example, for packaging purposes.

o) The procedure as described in Example 12a) was followed, except that the formulation contained a solution of 2 parts of cane sugar in 1 part of a 50% styrene/butadiene polymer latex (commercially available as Baystal® K 8525, from Bayer AG) instead of A/3. A foamed plastic was obtained having a weight per unit volume of 38 g/l and a semirigid character.

p) The procedure as described in Example 12a) was followed, except that a solution of 2 parts of saccharose in 1 part of a 50% polyurethane latex (commercially available as Impranil® DLN, from Bayer AG) was used instead of A/3, and only 1.1 parts of 50% NaOH were added to the formulation. A foamed plastic was obtained having a weight per unit volume of 33 g/l and a semirigid character.

q) The procedure as described in Example 12a) was followed, except that the formulation contained a solution of 2 parts of saccharose in 1 part of a 50% silica sol (commercially available as Baykisol® 200, from Bayer AG) instead of A/3, and 4 parts of F/1 are used. A fine-pored foamed plastic having a weight per unit volume of 31 g/l was obtained, which was suitable for shock absorption purposes.

r); s); t) The procedure as described in Example 12a) was followed, except in each case a 70%, 65% or 60%, respectively, aqueous beet sugar solution was substituted for A/3 in the formulation. In all cases fine-pored foamed plastics approximately similar to a) having a weight per unit volume of 30 g/l were obtained. These may be used, for example, as insulating, absorbent and shock-absorbing packaging material.

u) The procedure as described in Example 12a) was followed, except that P/2 was substituted for P/1 and 3 parts of F/1 were used. A relatively brittle light foamed plastic having a weight per unit volume of 19 g/l was obtained. This material may be used as filling for cavities or as a sandwich inner layer. These sandwich layers may also be coated with an airtight plastics sheet and evacuated, which makes them suitable as an insulating material.

v) The procedure as described in Example 12a) was followed, except that the polyisocyanate was a mixture of 70 parts of P/1, 10 parts of P/2 and 20 parts of P/3, and 3 parts of F/1 were used. A fine-pored foamed plastic having a weight per unit volume of 26 g/l was obtained, which was used as insulating material.

w) The procedure as described in Example 12a) was followed, except the formulation contained A/9 instead of A/3. Similarly to Example 12a), a stable, fine-pored ductile foam was obtained. This material was used as a shock-absorbing packaging material and as an insulating material.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of optionally cellular polyurethanes and/or polyurethane ureas comprising reacting at least one polyisocyanate with a mixture comprising
   A) one or more non-basic compounds having a molecular weight of 62 to 10,000 and containing at least two hydroxyl groups; and
   B) at least one component selected from the group consisting of:
      1) at least one basic polyhydroxyl compound comprising
         i) at least one compound selected from the group consisting of monoalkanolamines, dialkanolamines, trialkanolamines and mixtures thereof, and
         ii) at least one compound having an OH number of from 300 to 800, said compound being the reaction product of a) an alkylene oxide and b) a compound selected from the group consisting of ammonia, alkanolamines, diamines and polyamines, and
      2) at least one acid or the salt thereof, wherein said acid is an organic carboxylic acid having less than 8 carbon atoms or an inorganic acid; and
   C) at least one component selected from the group consisting of:
      1) at least one fatty acid having more than 8 carbon atoms, and
      2) at least one salt of said fatty acid;
wherein said reaction is at a temperature of from 0° to 150° C. and component A) is present as an at least 50 wt. % aqueous solution.

2. The process of claim 1, wherein said reaction is at a temperature of from 10° to 60° C., and component A) is present as a 60 to 95 wt. % aqueous solution.

3. The process of claim 1, wherein said mixture additionally comprises at least one component selected from the group consisting of
   D) conventional stabilizers,
   E) blowing agents,
   F) auxiliary substances, and
   G) fillers.

4. The process of claim 1, wherein said non-basic compounds having a molecular weight of 62 to 10,000 and containing at least two hydroxyl groups are selected from the group consisting of polyalcohols, sugars, N-methylol compounds, C-methylol compounds, reaction products of phosphoric acids with basic polyols, reaction products of boric acids with basic polyols, protein solutions, protein hydrolysate solutions, and mixtures thereof, wherein said basic polyols have pH values of from 5 to 8 as measured in aqueous solution.

5. The process of claim 4, wherein said non-basic polyols have pH values of from 6 to 7 as measured in aqueous solution.

6. The process of claim 1, wherein said basic polyhydroxyl compounds B)1) comprise
   i) at least one trialkanolamine and
   ii) at least one compound having an OH number of from 400 to 600, said compound being the reaction product of
      a) ethylene oxide, propylene oxide, or mixtures thereof and
      b) a compound selected from the group consisting of ammonia, trialkanolamines, ethylenediamine, hexamethylenediamine and polyethylene polyamines.

7. The process of claim 6, wherein B)1)i) said trialkanolamine comprises triethanolamine.

8. The process of claim 6, wherein B)1)ii) comprises at least one compound having on OH number of from 450 to 500, and said compound is the reaction product of a) propylene oxide and b) triethanolamine.

9. The process of claim 1, wherein said component B)2) is selected from the group consisting of organic acids comprising lower aliphatic carboxylic acids and inorganic acids comprising o-phosphoric acid.

10. The process of claim 1, wherein said fatty acids C)1) comprise at least one compound selected form the group consisting of i) aliphatic, long-chain, saturated carboxylic acids having 9 to 24 carbon atoms, and ii) aliphatic, long-chain, unsaturated carboxylic acids having 9 to 24 carbon atoms.

11. The process of claim 10, wherein i) said aliphatic, long chain, saturated carboxylic acids contain 12 to 24 carbon atoms, and ii) said aliphatic, long-chain, unsaturated carboxylic acids contain 12 to 24 carbon atoms.

12. The process of claim 10, wherein said fatty acid C)1) comprises oleic acid.

13. The process of claim 1, wherein component C)2) said salts of the fatty acids comprise i) reaction products of said fatty acid with an alkali metal compound, or ii) reaction product of said fatty acid with the basic polyhydroxyl compounds B)1).

14. The process of claim 3, wherein said stabilizers D) comprise polyetherpolysiloxane stabilizers.

15. The process of claim 3, wherein said blowing agents E) comprise at least one compound selected from the group consisting of fluorocarbons, chlorofluorocarbons and hydrocarbons.

16. The process of claim 15 wherein said blowing agent comprises cyclopentane.

17. The process of claim 3, wherein said auxiliary substances F) comprise urea as a processing agent, and, optionally, one or more compounds selected from the group consisting of activators, surfactants, regulators of cell size and cell type, biocides, preservatives, flameproofing agents, colorants, odorous substances and release agents.

18. The foamed plastics produced by the process of claim 1.

* * * * *